Sept. 10, 1929.　　　W. BEUSCH　　　1,727,858
MEANS FOR METERING ALTERNATING CURRENTS
Filed Feb. 17, 1926
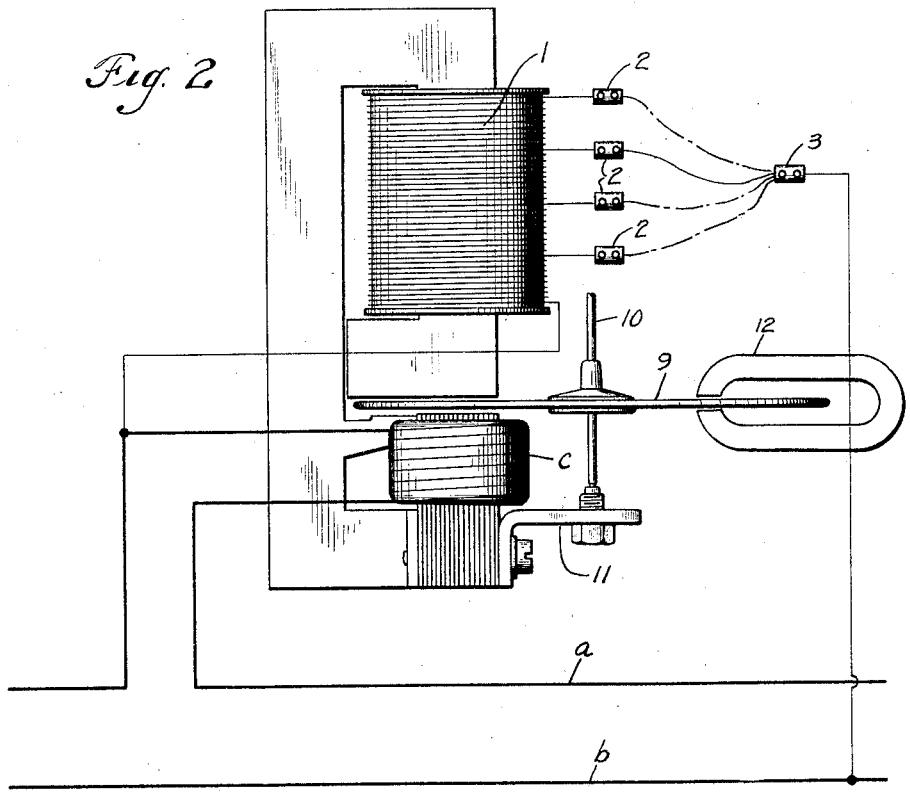
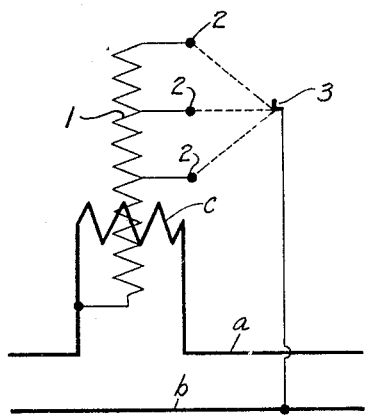
INVENTOR
W. Beusch
BY John D. Morgan
ATTORNEY Patented Sept. 10, 1929.

1,727,858

UNITED STATES PATENT OFFICE.

WILLI BEUSCH, OF ZUG, SWITZERLAND.

MEANS FOR METERING ALTERNATING CURRENTS.

Application filed February 17, 1926. Serial No. 88,783.

The invention relates to measuring devices for alternating currents, and more particularly to wattmeters and watt hour meters, for measuring either single or polyphase currents of different voltages by directly controlling the action of the pressure coil on the metering mechanism in reference to the different voltages.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel method parts, constructions, arrangements, combinations and improvements herein shown and described.

The drawing is a purely diagrammatic representation of power lines, a current coil and a pressure coil with one embodiment of the present invention applied thereto, in a manner which will be clear to those skilled in the art.

Fig. 1 is a diagrammatic showing of an embodiment of the invention; and

Fig. 2 is an elevation of a part of a meter embodying the invention.

The invention is directed to providing a method for measuring the current consumption under different voltage ratings, that is, different voltages impressed on the power line in either single or polyphase circuits by means of directly controlling the voltage and impedance of the pressure coil proportionately to the different voltage ratings employed at different times, thereby maintaining substantially the same induction flux and substantially the same relation between the ohmic resistance and the reactance for the different voltage ratings. The invention is also directed to induction meters of various types employing or embodying such method.

In the practical and actual embodiments of the invention, as at present preferred and practiced, the voltage control of the pressure coil is effected by changing the resistance of the pressure coil, through tapping the winding of the coil at various points, or by selectively varying the resistance of the coil wire in different parts, as for instance, by selecting or employing wire of different diameters in various parts of the coil, in connection with taps or equivalent controlling devices; whereby the reactance and ohmic resistance are maintained substantially uniform, so as to maintain a practically constant torque on the disc or other driven element which controls the registering mechanism.

Referring now in detail to the embodiment of the invention which is diagrammatically illustrated in Fig. 1, the power wires of the circuit are represented by $a$ and $b$, and for simplicity in explanation but a single phase two wire circuit is shown, although it will be understood that circuits employing a greater number of wires and carrying polyphase currents, may be employed, in which case two or more of the positive wires would be at different voltages at different times. A current winding of a meter is indicated at $c$.

The pressure coil of a meter is indicated by 1, and is shown with three taps 2 located at various points along the winding, and these may be connected selectively, in relation to the particular voltage to be employed, with a point 3 in the pressure circuit; the resistance and voltage of the pressure coil itself being thereby directly proportioned to the voltage then employed in the power circuit. It will be understood, of course, that in the broader aspects of the invention, any number of taps may be employed, or other known means, for directly varying and controlling the voltage, and consequently the impedance of the pressure coil, to maintain the same induction flux or torque for the different pressure or voltage ratings.

In Fig. 2 is shown certain of the essential devices of an induction meter, such as a watt meter, comprising a meter disc 9, fixed on a spindle 10, journaled at one end in a frame 11, and similarly journaled at the opposite end. A brake magnet 12 is shown in operative relation to the disc 9.

The circuits, and current and pressure coils are numbered correspondingly to the diagrammatic showing of the corresponding parts in Fig. 1, as are also the taps on the pressure coil in connection with the circuit connection 3.

The invention in its broader aspects is not limited to the specific mechanisms shown and described but departures may be made therefrom within the scope of the accompanying claims without departing from the principles of the invention and without sacrificing its chief advantages.

What I claim is:—

1. An induction meter including in combination a rotating member for operating registering mechanism, a current coil for actuating and controlling the rotating member, and a pressure coil for actuating and controlling the rotating member and means for selectively varying the impedance of the pressure coil proportionally to changes in the voltage to maintain the reactances and ohmic resistances substantially unchanged with predetermined imposed changes in the circuit voltages employed.

2. An induction meter including in combination a movable member for operating registering mechanism, and actuating and controlling mechanism for said member, comprising a current coil and a pressure coil and a plurality of taps at different points in the pressure coil and means for selectively connecting any one of said taps to the pressure shunt circuit.

In testimony whereof, I have signed my name to this specification.

WILLI BEUSCH.